United States Patent
Parsche et al.

(10) Patent No.: US 10,823,812 B2
(45) Date of Patent: Nov. 3, 2020

(54) ELORAN RECEIVER WITH FERROMAGNETIC BODY AND RELATED ANTENNAS AND METHODS

(71) Applicant: EAGLE TECHNOLOGY, LLC, Melbourne, FL (US)

(72) Inventors: Francis E. Parsche, Palm Bay, FL (US); Matthew R. Samuelson, Bixby, OK (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 225 days.

(21) Appl. No.: 16/013,106

(22) Filed: Jun. 20, 2018

(65) Prior Publication Data

US 2019/0391223 A1  Dec. 26, 2019

(51) Int. Cl.

| | |
|---|---|
| *G01S 1/24* | (2006.01) |
| *H01Q 7/06* | (2006.01) |
| *H01Q 13/10* | (2006.01) |
| *G01S 5/02* | (2010.01) |
| *H01Q 13/22* | (2006.01) |
| *H01Q 13/24* | (2006.01) |
| *H01Q 21/29* | (2006.01) |
| *H01Q 21/24* | (2006.01) |
| *G01S 1/00* | (2006.01) |

(52) U.S. Cl.
CPC ............... *G01S 1/245* (2013.01); *H01Q 7/06* (2013.01); *H01Q 13/10* (2013.01)

(58) Field of Classification Search
CPC ......... G01S 1/24; G01S 1/245; H04L 9/0822; H04W 12/02; H04W 12/04; H01Q 7/06; H01Q 13/10

USPC .................................................. 342/388, 389
See application file for complete search history.

(56) References Cited

U.S. PATENT DOCUMENTS

| | | | | |
|---|---|---|---|---|
| 3,623,116 | A * | 11/1971 | Green ....................... | H01Q 7/08 343/788 |
| 4,879,570 | A * | 11/1989 | Takizawa ................. | H01Q 7/06 343/713 |
| 5,796,366 | A | 8/1998 | Grebnev et al. | |
| 6,014,111 | A | 1/2000 | Johannessen | |
| 6,873,300 | B2 | 3/2005 | Mendenhall | |
| 6,928,265 | B2 | 8/2005 | Johannessen | |
| 8,704,721 | B2 * | 4/2014 | Ferrer Herrera ....... | H01Q 21/28 343/788 |
| 9,571,132 | B1 | 2/2017 | Hershberger | |
| 9,798,033 | B2 * | 10/2017 | Olsson ..................... | G01V 3/10 |

(Continued)

FOREIGN PATENT DOCUMENTS

EP          1122814 A2     8/2000

OTHER PUBLICATIONS

Chu, L. J., "Physical limitations of omnidirectional antennas" Journal of Applied Physics 19; Dec. 1948; pp. 1163-1175.
(Continued)

*Primary Examiner* — Bernarr E Gregory
(74) *Attorney, Agent, or Firm* — Allen, Dyer, Doppelt + Gilchrist, P.A.

(57) ABSTRACT

An eLORAN receiver may include an antenna and eLORAN receiver circuitry coupled to the antenna. The antenna may have a ferromagnetic core including a ferromagnetic medial portion and ferromagnetic arms extending outwardly, and a respective electrically conductive layer surrounding each of the ferromagnetic arms and having a slot.

20 Claims, 5 Drawing Sheets

(56) References Cited

U.S. PATENT DOCUMENTS

| | | | | |
|---|---|---|---|---|
| 10,115,517 | B2* | 10/2018 | Ette | H01Q 21/24 |
| 2004/0061660 | A1* | 4/2004 | Yoshida | H01Q 7/06 |
| | | | | 343/788 |
| 2005/0012673 | A1* | 1/2005 | Parsche | H01Q 13/12 |
| | | | | 343/767 |
| 2006/0033664 | A1* | 2/2006 | Soler Castany | H01Q 1/40 |
| | | | | 343/700 MS |
| 2007/0120739 | A1* | 5/2007 | Johanessen | H01Q 7/06 |
| | | | | 342/388 |
| 2013/0033408 | A1* | 2/2013 | Miki | H01Q 21/24 |
| | | | | 343/788 |
| 2014/0176385 | A1* | 6/2014 | Apostolos | H01Q 21/24 |
| | | | | 343/790 |
| 2016/0076870 | A1* | 3/2016 | Almog | H01Q 9/22 |
| | | | | 324/207.23 |
| 2019/0377055 | A1* | 12/2019 | Offermans | H04L 9/12 |

OTHER PUBLICATIONS

Jie et al. "Application research of Intelligent magnetic antenna in Loran-C signal receiving and processing" IEEE Xplore; 2010 2nd International Conference on Signal Processing Systems; Aug. 23, 2010; Abstract Only.

Micrologic—New compact Loran C is submersion proof: Motorboating-ND-Jan. 1984; p. 90; https://books.google.com/books?id=hPM1aqaamaaj. pp. 1.

Bonnie Dahl "What's new in Loran" Cruising World: Jan. 1988; https://books.google.com/books?Id=InheK-WGcAcC&pg=PA75 &jpg=PA75&dq=dahl+what's+new+in+loran&source=bt&ots= 8WgiFCXDU7&sig=_YCfbZ5W-PjPjg1pDtfFejXf_Uc&hf.en&sa= X&ved=
0ahUKEwijrvTkzt3bAhUO3VMKHZA4A2cQ6AEIRzAG#v=onepage &q=dahl%20what's%20new%20in%20loran&f=false Abstract Only.

Mitch Narins "The Global Loran / eLoran Infrastructure Evolution A Robust and Resilient PNT Backup for GNSS" https://www.gps.gov/governance/advisory/meetings/2014-06/narins.pdf Jun. 3, 2014. pp. 48.

Shen et al. "A Novel Wideband Printed Diversity Antenna for Mobile Handsets" 2012 IEEE 75th Vehicular Technology Conference (VTC Spring) Date of Conference: May 6-9, 2012: Abstract Only.

Richard Degener Loran navigation signal back on and better than before https://www.pressofatlanticcity-com/news/loran-navigation-signal-back-on-and-better-than-before/article_21d19298-16d0-11e5-9a69-1343edc2e90b.html; Jun. 19, 2015; pp. 5.

Bartone et al., "H-field antenna considerations for eLoran aviation applications", IEEE, 2008, pp. 810-823.

* cited by examiner

ELORAN RECEIVER WITH FERROMAGNETIC BODY AND RELATED ANTENNAS AND METHODS

TECHNICAL FIELD

The present disclosure relates to the field of communication systems, and, more particularly, to radio frequency antennas and related methods.

BACKGROUND

For communications in the Very Low Frequency (VLF), Low Frequency (LF), and Medium Frequency (MF) ranges, for example, relatively large ground-based antenna towers are used for transmitting such signals. Such antenna configurations may include a tower several hundred feet in height connected to the ground at its base, with numerous guy wires connecting the tower to ground for stability.

One example medium wave antenna system is disclosed in U.S. Pat. No. 6,873,300 to Mendenhall. This patent discloses an antenna system including an electrically conductive radiating mast that extends generally vertical relative to earth ground. The mast has a lower end for receiving RF energy for radiation thereby at an operating RF frequency, and an upper end. A plurality of N radial, electrically conductive, wires is provided with each having an inner end and an outer end. The inner ends of the radial wires are electrically connected together and located proximate to the vertical mast. The radial wires are elevated throughout their lengths above the level of earth ground and extend radially outward from the vertical mast. A tuning device, such as an adjustable inductor, is connected to the radial wires for adjusting the impedance thereof such that the radial wires resonate at the operating frequency.

Another example where large scale tower based antennas are used is low frequency transmission stations for navigation systems, such as the long range navigation (LORAN) system. LORAN was developed in the United States during World War II. Subsequent implementations provided for enhancements in accuracy and usefulness, including LORAN-C and the later enhanced LORAN (eLORAN) implementations. More particularly, eLORAN is a low frequency radio navigation system that operates in the frequency band of 90 to 110 kHz. Low frequency eLORAN transmissions can propagate by ground wave, a type of surface wave that hugs the earth. Ionospheric reflections or sky waves are another significant mechanism of eLORAN wave propagation. With typical low frequency antennas, the tower itself is used as a monopole antenna. Because of the height of the tower, which may be 600 feet or more as a result of the operating wavelength, many upper wires connect to the tower top forming a resonating capacitor. These wires, known as top loading elements (TLEs), may approximate a solid cone.

eLORAN may operate at low frequencies, such as 100 kHz, making the transmit antenna physical size large. Yet, in eLORAN, the antenna electrical size is small relative to the wavelength. Physics may limit the electrically small antenna fixed tuned bandwidth. One theory is the Chu Limit as described in the reference "Physical limitations of omnidirectional antennas", Chu, L. J. (December 1948), Journal of Applied Physics 19: 1163-1175, which is called out as a reference herein. The Chu Bandwidth Limit equation may $Q=1/kr^3$, where Q is a dimensionless number relating to bandwidth, k is the wave number=$2\pi/\lambda$, and r is the radius of a spherical analysis volume enclosing the antenna. Antenna radiation bandwidth is a matter of considerable importance to eLORAN as it enables sharp eLORAN pulses with fast rise times to be transmitted.

With the rise of satellite based navigations systems such as the Global Positioning System (GPS), there has been relatively little development or investment in terrestrial-based navigation systems, such as eLORAN, until recently. A renewed interest in such systems has arisen as a backup to satellite navigation systems, particularly since low frequency eLORAN signals are less susceptible to jamming or spoofing compared to the relatively higher frequency GPS signals. As such, further developments in eLORAN antenna systems may be desirable in certain applications.

As noted above, given the operational frequency of eLORAN systems and the typical deployment in land vehicles and watercraft, the design of the eLORAN antenna may present unique design issues. In particular, given the mobile application of the eLORAN antenna, the antenna must be small sized and durable. Nevertheless, given the small size of the eLORAN antenna, this makes the antenna intrinsically inefficient as a receiver of these low frequency signals.

SUMMARY

Generally, an eLORAN receiver may comprise an antenna and eLORAN receiver circuitry coupled thereto. The antenna may comprise a ferromagnetic core comprising a ferromagnetic medial portion and a plurality of ferromagnetic arms extending outwardly therefrom. The antenna may also include a respective electrically conductive layer surrounding each of the plurality of ferromagnetic arms and having a slot therein.

Moreover, the plurality of ferromagnetic arms may be arranged in aligned pairs. The antenna may comprise at least one feed point coupled to the respective electrically conductive layer. The at least one feed point may comprise a winding of electrically conductive wire.

In some embodiments, the antenna may comprise at least one capacitive element coupled across opposing edges of each slot. The plurality of ferromagnetic arms may define a cross-shape. The antenna may comprise an inductive coupler extending across the ferromagnetic medial portion.

For example, the ferromagnetic core may comprise at least one of ferrite, powdered iron, electrical steel, and nanocrystalline iron. The respective electrically conductive layer may comprise copper foil, for instance. The ferromagnetic core may comprise a stacked arrangement of ferromagnetic core segments.

Another aspect is directed to an antenna coupled to eLORAN receiver circuitry. The antenna may include a ferromagnetic core comprising a ferromagnetic medial portion and a plurality of ferromagnetic arms extending outwardly therefrom, and a respective electrically conductive layer surrounding each of the plurality of ferromagnetic arms and having a slot therein.

Yet another aspect is directed to a method for making an antenna coupled to eLORAN receiver circuitry. The method may include forming a ferromagnetic core comprising a ferromagnetic medial portion and a plurality of ferromagnetic arms extending outwardly therefrom. The method may include forming a respective electrically conductive layer to surround each of the plurality of ferromagnetic arms and having a slot therein.

DETAILED DESCRIPTION

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout.

Figure 1:
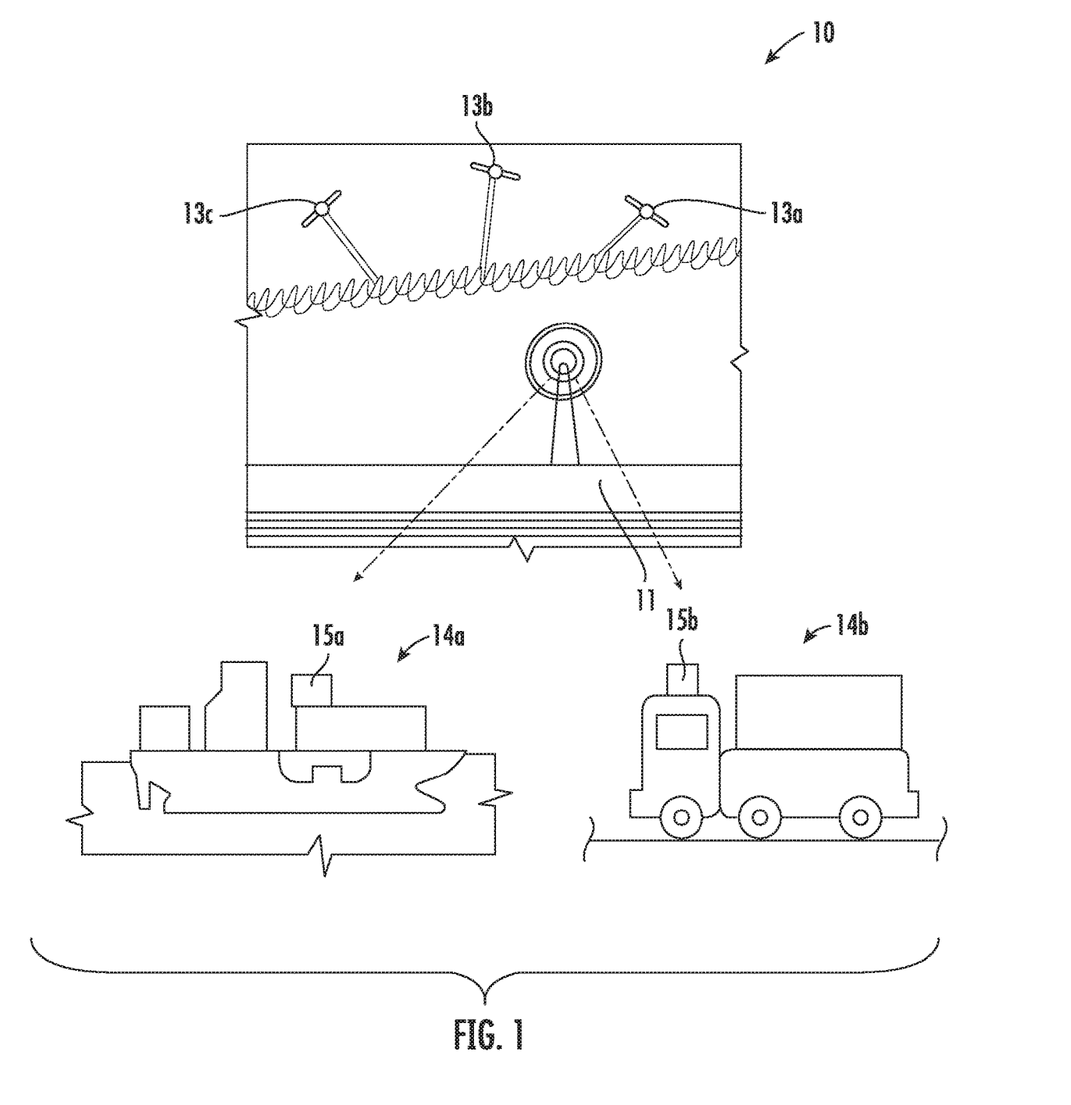
FIG. 1 is a schematic diagram of an eLORAN communication system, according to the present disclosure.
Figure 2:
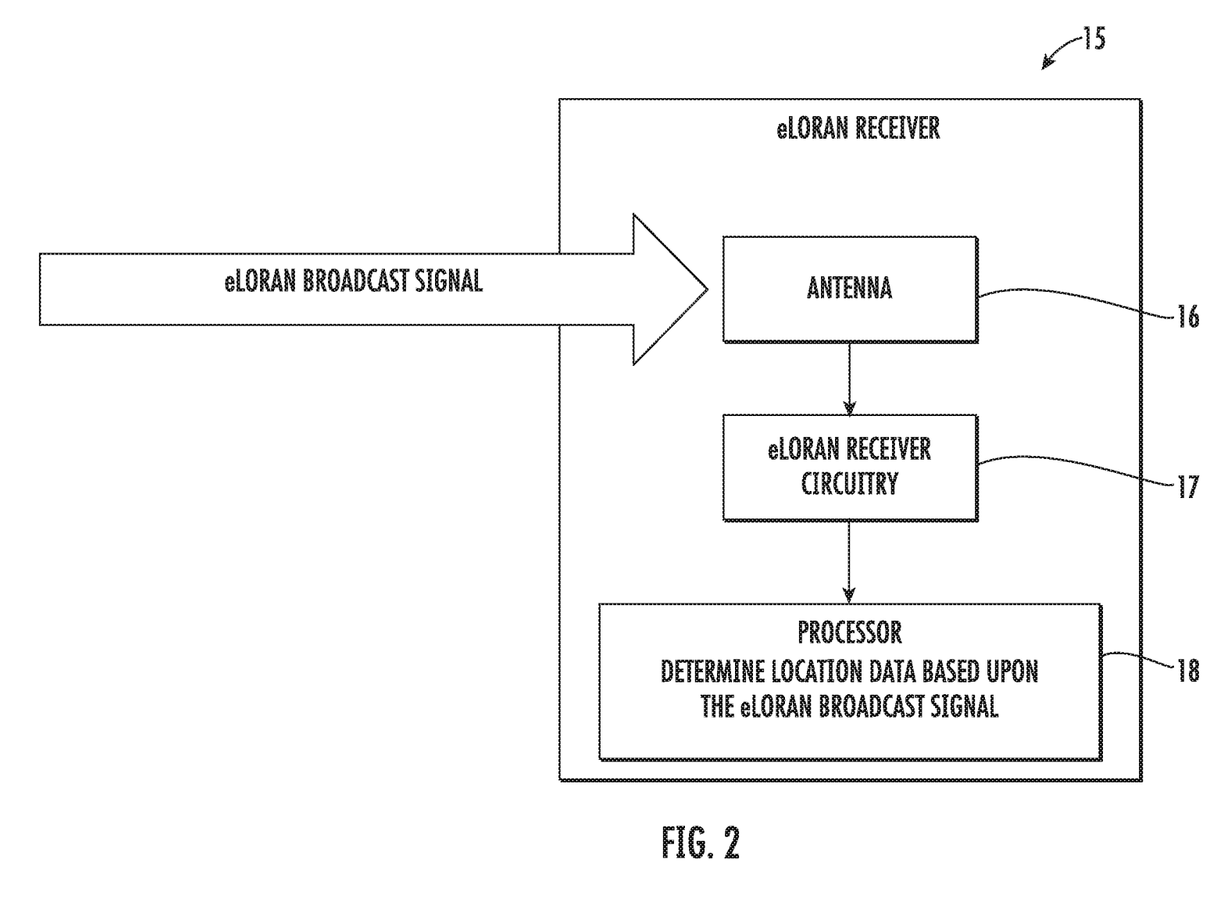
FIG. 2 is an eLORAN receiver from the eLORAN communication system of FIG. 1.
Figure 3:
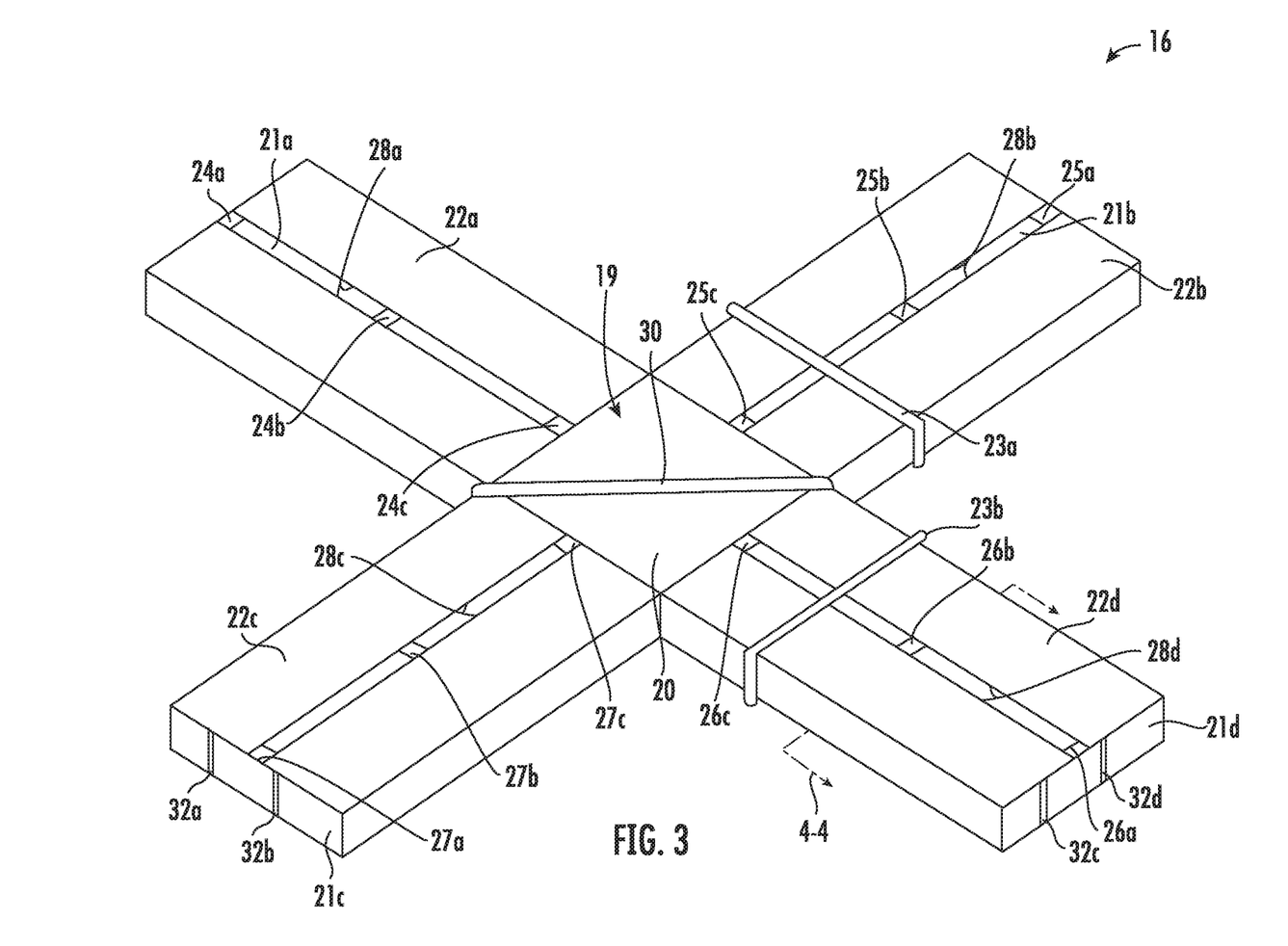
FIG. 3 is an antenna from the eLORAN receiver of FIG. 2.

Referring initially to FIGS. 1-3, an eLORAN communication system 10, according to the present disclosure, is now described. The eLORAN communication system 10 illustratively includes an eLORAN broadcast station 11 configured to transmit an eLORAN broadcast signal.

Although not part of the eLORAN communication system 10, a plurality of GPS satellites 13a-13c is depicted. It should be appreciated that due to the low power and high frequency nature of GPS signals from the plurality of GPS satellites 13a-13c, the respective GPS signals are readily subject to natural and man-made interference (e.g. spoofing, jamming). Because of this, it is helpful to provide the eLORAN communication system 10 as detailed herein.

The eLORAN communication system 10 illustratively includes a plurality of vehicles 14a-14b. In the illustrated embodiment, the plurality of vehicles 14a-14b illustratively includes a watercraft 14a, and a land based vehicle 14b. Each of the plurality of vehicles 14a-14b illustratively includes an eLORAN receiver 15a-15b configured to receive and process the eLORAN broadcast signal.

Each eLORAN receiver 15a-15b illustratively includes an antenna 16 and eLORAN receiver circuitry 17 coupled thereto. The eLORAN receiver 15a-15b illustratively includes a processor 18 coupled to the eLORAN receiver circuitry 17 and configured to determine location data based upon the eLORAN broadcast signal. As will be appreciated by those skilled in the art, the antenna 16 is an H-field antenna (i.e. which have radial magnetic near fields). In some embodiments, the antenna 16 may include a collocated companion E field antenna (not shown) as well.

The antenna 16 illustratively includes a ferromagnetic core 19 comprising a ferromagnetic medial portion 20 and a plurality of ferromagnetic arms 21a-21d extending outwardly therefrom. The ferromagnetic medial portion 20 is illustratively square-shaped, and each of the plurality of ferromagnetic arms 21a-21d is rectangle shaped. Of course, these shapes are exemplary and can vary in other embodiments.

Moreover, the plurality of ferromagnetic arms 21a-21d are arranged in aligned pairs in the depicted embodiment to define first and second antenna elements (e.g. north-south and east-west antenna elements). The first and second antenna elements have slightly offset resonant frequencies (i.e. an act which causes respective phase shifts of −45° and +45° in each antenna element received signal). The first and/or second antenna elements may operate in one or more of three radiation pattern modes: omnidirectional, sine θ directional and cosine θ directional. The first and second antenna elements each alone provide the individual azimuthal radiation patterns that are sine and sine+90°=cosine in shape. As can be appreciated by those skilled in the art, a sine or cosine radiation pattern is directional in azimuth with two lobes and two nulls. To create the omnidirectional radiation pattern, the received signals from the two antenna elements are combined. The resulting sum is an omnidirectional radiation pattern, and is circular in azimuth with less than 3 dB of amplitude ripple.

In this exemplary embodiment, the plurality of ferromagnetic arms 21a-21d may define a cross-shape. In other words, the aligned pairs of ferromagnetic arms 21a/21d & 21b/21c are substantially orthogonal (i.e. a transverse angular relationship between 80 and 100 degrees). In other embodiments, the plurality of ferromagnetic arms 21a-21d may define a polygonal array, such as a square, or an L-shaped array.

As mentioned previously each aligned pair of ferromagnetic arms 21a/21d & 21b/21c is configured to provide independent sine and cosine antenna radiation patterns. This is the result of the substantially orthogonal relation between the aligned pairs of ferromagnetic arms 21a/21d & 21b/21c.

The antenna 16 illustratively includes a respective electrically conductive layer 22a-22d surrounding each of the plurality of ferromagnetic arms 21a-21d and having a slot 28a-28d therein. The slot 28a-28d is longitudinal in orientation and illustratively extends completely from the ferromagnetic medial portion 20 to distal ends of each of the plurality of ferromagnetic arms 21a-21d. Also, each slot 28a-28d is illustratively rectangle-shaped with substantially parallel opposing edges (i.e. within ±5° of parallel).

The respective electrically conductive layers 22a-22d may comprise copper foil or plating, for example. In other embodiments, the respective electrically conductive layers 22a-22d may comprise other electrically conductive materials, such as gold, silver, and/or aluminum. In the exemplary embodiment, each of the electrically conductive layers 22a-22d is formed as a slotted rectangular tube. In other embodiments, the electrically conductive layers 22a-22d may have cylindrical shape, i.e. a tube with a circular/oval cross-sectional shape.

The antenna 16 illustratively includes first and second feed points 23a-23b inductively coupled to the respective electrically conductive layers 22a-22d or antenna elements. In the depicted embodiment, the first and second feed points 23a-23b each comprises a winding of insulated electrically conductive wire (e.g. illustratively shown as 1-turn, but can be ≥1-turn). The one or more turn winding may be akin to an induction coupling to the respective electrically conductive layers 22a-22d, for example, the winding is a transformer primary and the respective electrically conductive layers 22a-22d are the transformer secondary.

In the illustrated embodiment, the antenna 16 comprises a plurality of capacitive elements 24a-24c, 25a-25c, 26a-26c, 27a-27c coupled across the opposing edges of each slot 28a-28d. Each of the plurality of capacitive elements 24a-24c, 25a-25c, 26a-26c, 27a-27c may comprise a resonating capacitor, such as, a chip capacitor (e.g. ceramic chip capacitor). In another embodiment, each of the plurality of capacitive elements 24a-24c, 25a-25c, 26a-26c, 27a-27c may comprise a "jellyroll" capacitive element.

Figure 6:
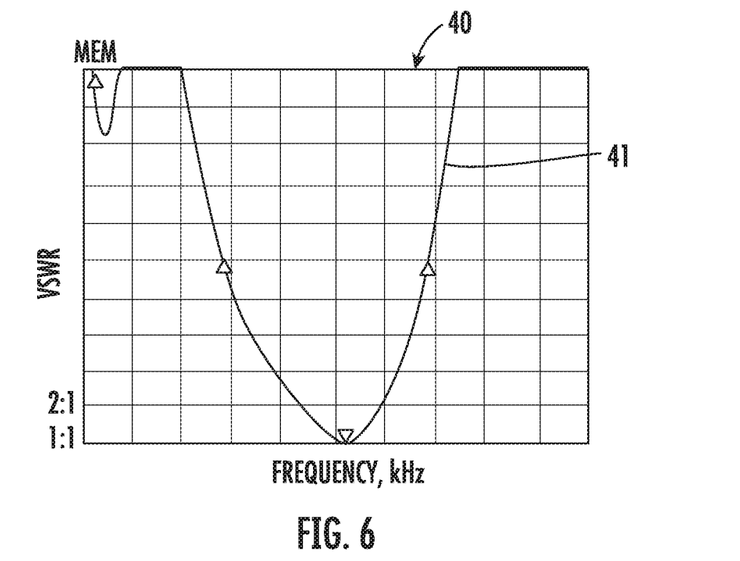

The "jellyroll" capacitive element comprises overlapping conductor (e.g. aluminum, copper) and insulator (e.g. polyethylene insulator film) sheets turned over each other, i.e. an electrical conductor/insulator jellyroll of sorts. The operating frequency of the "jellyroll" capacitive element is dependent on the number of turns in the structure. In FIG. 6, a diagram 40 and a plot 41 depict the voltage standing wave ratio (VSWR) of an exemplary embodiment of the "jellyroll" capacitive element. VSWR is a measure of the energy the antenna accepts and a low value is preferential. As can be seen, a single tuned or quadratic frequency response is provided by a single "jellyroll" antenna element.

By way of explanation, the tuning response or frequency setting of a "jellyroll" may be explained. Consider if the "jellyroll" has say 1 and ¼ turns. The first turn may comprise a one turn loop antenna. The remaining ¼ turn material that overlaps, but does not touch the beginning of the first turn, acts a capacitor plate to that beginning of the first turn. Thus, the "jellyroll" provides both the loop antenna conductor and distributed, overlapping capacitor for antenna resonance. The more the "jellyroll" turns, the lower will be the antenna resonant frequency. Approximately, $\Delta f \approx \sqrt{\Delta n}$, where f is frequency in kHz and n is the number of rolls in the "jellyroll". Fractional n is permitted so the number of rolls may include partial turns. It is even possible to nibble/remove some of the "jellyroll" sheets with scissors to fine tune.

The antenna 16 illustratively includes an inductive coupler 30 extending across the ferromagnetic medial portion 20. In this embodiment, the inductive coupler 30 comprises a 2-turn winding of insulated electrically conductive wire. The inductive coupler 30 is configured to serve as a power summer for the signals received by each of the two antenna elements since the inductive coupler is oriented between the aligned pairs of ferromagnetic arms 21a/21d & 21b/21c (i.e. the first and second antenna elements). The summing action provides a usefully circular radiation pattern for the antenna 16. The inductive coupler 30 is arranged at a 45° angle of cant with regards to the first and second antenna elements so the inductive coupler 30 winding encircles the junction of aligned pairs of ferromagnetic arms 21a/21d & 21b/21c (i.e. the first and second antenna elements). The omnidirectional mode antenna load resistance is adjusted by adjusting the number of inductive coupler 30 turns. In other words, the illustrated embodiment is merely exemplary in the number of turns for the inductive coupler 30. 50 ohms has been obtained in practice as well as other resistance values. The inductive coupler 30 may function as a transformer primary with the first and second antenna elements so the aligned pairs of ferromagnetic arms 21a/21d & 21b/21c (i.e. the first and second antenna elements) serving as multiple transformer secondary windings at the same time.

Figure 4:
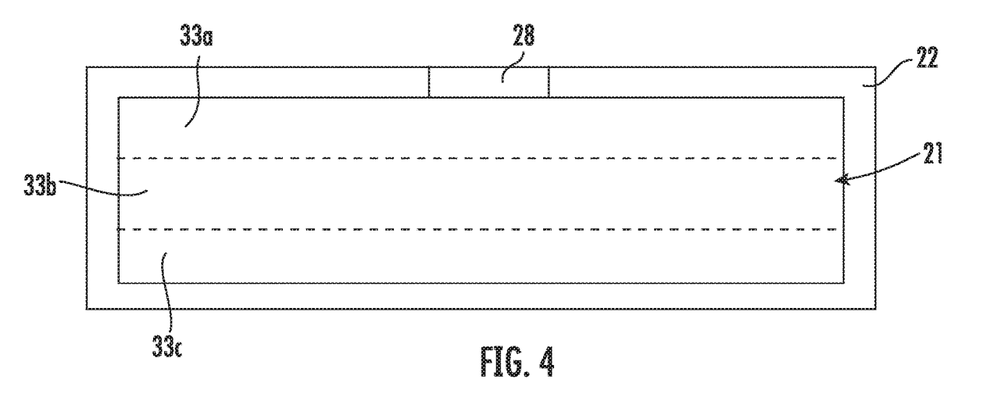
FIG. 4 is a schematic cross-section view of the antenna from FIG. 3 along line 4-4.

For example, the ferromagnetic core 19 may comprise at least one of ferrite, powdered iron, electrical steel (laminated silicon steel), and nanocrystalline iron. As perhaps best seen in FIGS. 3-4, the ferromagnetic core 19 comprises a plurality of straps 32a-32d positioned at distal ends of the plurality of ferromagnetic arms 21a-21d. The ferromagnetic core 19 comprises a stacked arrangement of ferromagnetic core segments 33a-33c, and the plurality of straps 32a-32d in cooperation with the respective electrically conductive layers 22a-22d retain the ferromagnetic core segments in the desired shape. In some embodiments, the stacked arrangement of ferromagnetic core segments 33a-33c may be retained together using alternatively or additionally an adhesive material between the ferromagnetic core segments.

Another aspect is directed to an antenna 16 to be coupled within an eLORAN receiver 15a-15b to eLORAN receiver circuitry 17. The antenna 16 includes a ferromagnetic core 19 comprising a ferromagnetic medial portion 20 and a plurality of ferromagnetic arms 21a-21d extending outwardly therefrom, and a respective electrically conductive layer 22a-22d surrounding each of the plurality of ferromagnetic arms and having a slot 28a-28d therein.

Yet another aspect is directed to a method for making an antenna 16 to be coupled within an eLORAN receiver 15a-15b to eLORAN receiver circuitry 17. The method includes forming a ferromagnetic core 19 comprising a ferromagnetic medial portion 20 and a plurality of ferromagnetic arms 21a-21d extending outwardly therefrom. The method includes forming a respective electrically conductive layer 22a-22d to surround each of the plurality of ferromagnetic arms 21a-21d and having a slot 28-28d therein.

Figure 5:
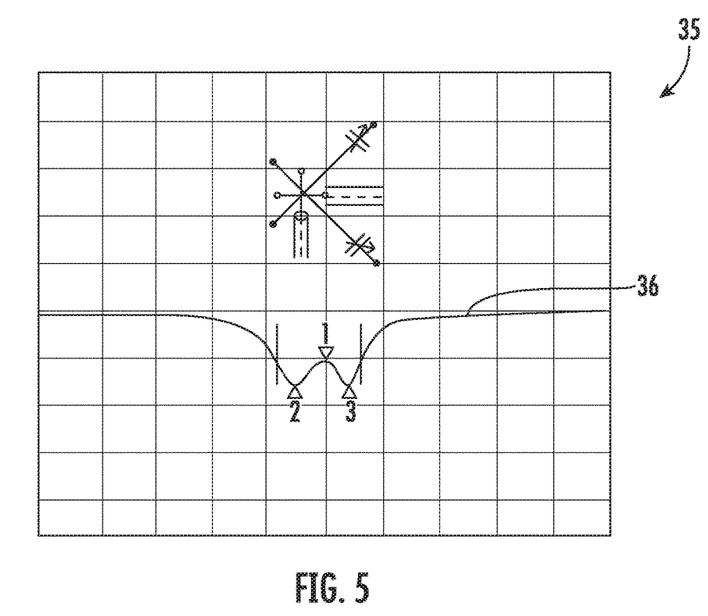
FIGS. 5-7 are diagrams of performance of elements of the antenna from the eLORAN receiver of FIG. 2.
Figure 7:
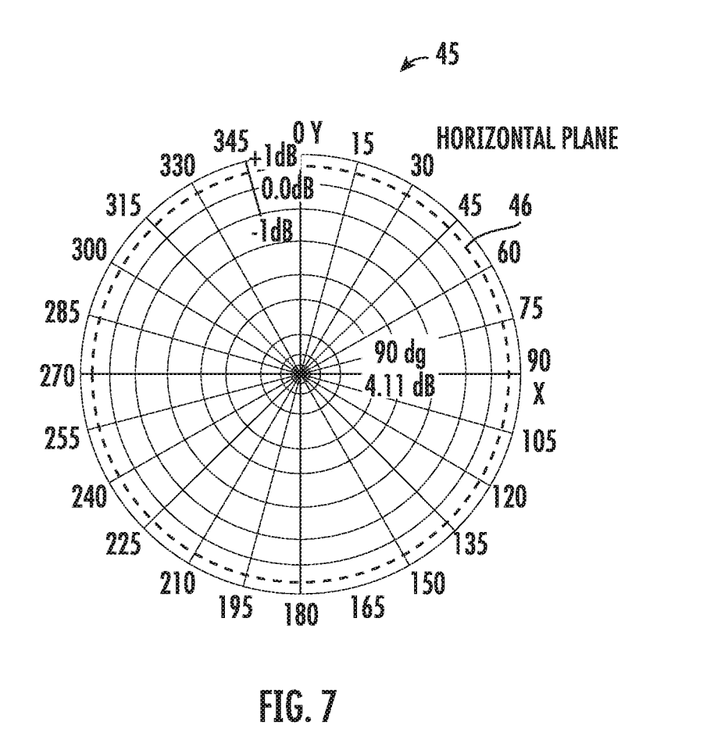

Referring to FIGS. 5 and 7, a diagram 35 depicts a representative plot 36 for VSWR for an embodiment of the antenna 16. As can be seen, a double tuning occurs with an extension of bandwidth over that of a single tuned antenna. Diagram 45 depicts a plot 46 of the directivity in dB azimuth for the antenna 16. For each of these plots 36, 46, the antenna 16 is operating in a phase quadrature omnidirectional mode.

The International telecommunications Union publishes a worldwide estimate of noise known as "Recommendation ITU-R P.372.8 Radio Noise". In the estimate, atmospheric noise, primarily due to lightning, occurs at the 100 kHz eLORAN frequency at an antenna noise factor $F_a$=of 74 dB more than 99.5 percent of the time at a quiet receiving site. This means that natural noise is 74 dB more than the thermal noise present in antenna conductors at 290° K. In such a circumstance, an antenna realized gain of −74 dB+10 dB receiver noise factor=−64 dBi is all that is needed to receive to ambient natural noise level. The present invention readily provides realized gains on −74 dB, and even more is available in other embodiments with size trade.

As discussed, in some approaches to eLORAN receivers in the 100 kHz range, there are some performance drawbacks. Helpfully, the antenna 16 provides performance enhancements over these approaches, in particular: improved H-field radial near field response while rejecting noise, greater bandwidth to increase accuracy, and providing a smaller sized package. Indeed, the antenna 16 provides an omnidirectional radiation pattern, as perhaps best seen in FIG. 7.

Advantageously, the antenna 16 rejects nearby electromagnetic interference, which in practice is predominately electric field (E-field). The antenna 16 uses one turn windings (first and second feed points 23a-23b) and slotted copper foil cylinders (respective electrically conductive layers 22a-22d) to minimize the separated charge and dipole moment of the antenna and to therefore minimize the E-field radial near field sensitivity. The antenna 16 has little to no dipole characteristic, thereby rejecting E-field noise. As may be appreciated by those skilled in the art, a long helix winding of prior approaches may have significant dipole moment as the helix is a transition structure between an inductor loaded dipole and a series fed array of small loops. The present invention avoids the unwanted dipole characteristics of the helix, which is of benefit.

As further theory, the omnidirectional radiation pattern mode is obtained by traveling wave rotation of electromagnetic energy in time. By tuning, the two orthogonally aligned pairs of ferromagnetic arms 21a/21d & 21b/21c (i.e. the first and second antenna elements) are −45 degrees and +45 degrees shifted in phase so one arm takes power when the other arm is not. Each arm couples power in a circular rotation in time.

An additional benefit of the antenna 16 is even further increased bandwidth, which is desired since the eLORAN channel bandwidth is 20 KHz or 20%, and the receive antenna is so small electrically. The increased bandwidth allows the pulses to be authentically conveyed to the eLORAN receiver 15 without time smearing so the increased accuracy of the eLORAN emission is brought to bear. Increased sky wave rejection may be possible as ground wave pulse rise can be detected earlier permitting the later arriving sky wave pulse to be rejected.

Separate north-south and east-west feed couplers (first and second feed points 23a-23b) are also provided to sense signal angle of arrival, which may be needed if one tower fails and as an enhancement. The bar slotted loop antennas (respective electrically conductive layers 22a-22d) use a special high permeability core of laminated silicon steel not previously appreciated as an antenna permeable.

Other features relating to communication systems are disclosed in co-pending application: titled "TOWER BASED ANTENNA INCLUDING MULTIPLE SETS OF ELONGATE ANTENNA ELEMENTS AND RELATED METHODS," which is incorporated herein by reference in its entirety.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. An enhanced LOng-RAnge Navigation (eLORAN) receiver comprising:
    an antenna and eLORAN receiver circuitry coupled thereto, the antenna comprising
        a ferromagnetic core comprising a ferromagnetic medial portion and a plurality of ferromagnetic arms extending outwardly therefrom, and
        a respective electrically conductive layer surrounding each of the plurality of ferromagnetic arms and having a slot therein.

2. The eLORAN receiver of claim 1 wherein said plurality of ferromagnetic arms are arranged in aligned pairs.

3. The eLORAN receiver of claim 1 wherein said antenna comprises at least one feed point coupled to said respective electrically conductive layer.

4. The eLORAN receiver of claim 3 wherein said at least one feed point comprises a winding of electrically conductive wire.

5. The eLORAN receiver of claim 1 wherein said antenna comprises at least one capacitive element coupled across opposing edges of each slot.

6. The eLORAN receiver of claim 1 wherein said plurality of ferromagnetic arms defines a cross-shape.

7. The eLORAN receiver of claim 1 wherein said antenna comprises an inductive coupler extending across said ferromagnetic medial portion.

8. The eLORAN receiver of claim 1 wherein said ferromagnetic core comprises at least one of ferrite, powdered iron, electrical steel, and nanocrystalline iron.

9. The eLORAN receiver of claim 1 wherein said respective electrically conductive layer comprises copper foil.

10. The eLORAN receiver of claim 1 wherein said ferromagnetic core comprises a stacked arrangement of ferromagnetic core segments.

11. An antenna to be coupled to enhanced LOng-RAnge Navigation (eLORAN) receiver circuitry, the antenna comprising:
    a ferromagnetic core comprising a ferromagnetic medial portion and a plurality of ferromagnetic arms extending outwardly therefrom; and
    a respective electrically conductive layer surrounding each of the plurality of ferromagnetic arms and having a slot therein.

12. The antenna of claim 11 wherein said plurality of ferromagnetic arms are arranged in aligned pairs.

13. The antenna of claim 11 wherein said antenna comprises at least one feed point coupled to said respective electrically conductive layer.

14. The antenna of claim 13 wherein said at least one feed point comprises a winding of electrically conductive wire.

15. The antenna of claim 11 wherein said antenna comprises at least one capacitive element coupled across opposing edges of each slot.

16. The antenna of claim 11 wherein said plurality of ferromagnetic arms defines a cross-shape.

17. The antenna of claim 11 wherein said antenna comprises an inductive coupler extending across said ferromagnetic medial portion.

18. A method for making an antenna coupled to enhanced LOng-RAnge Navigation (eLORAN) receiver circuitry, the method comprising:
    forming a ferromagnetic core comprising a ferromagnetic medial portion and a plurality of ferromagnetic arms extending outwardly therefrom; and
    forming a respective electrically conductive layer to surround each of the plurality of ferromagnetic arms and having a slot therein.

19. The method of claim 18 wherein the plurality of ferromagnetic arms is arranged in aligned pairs.

20. The method of claim 18 further comprising coupling at least one feed point to the respective electrically conductive layer.

* * * * *